April 1, 1958 C. C. RIEMENSCHNEIDER 2,828,826
PORTABLE RACK
Filed June 14, 1954 4 Sheets-Sheet 1
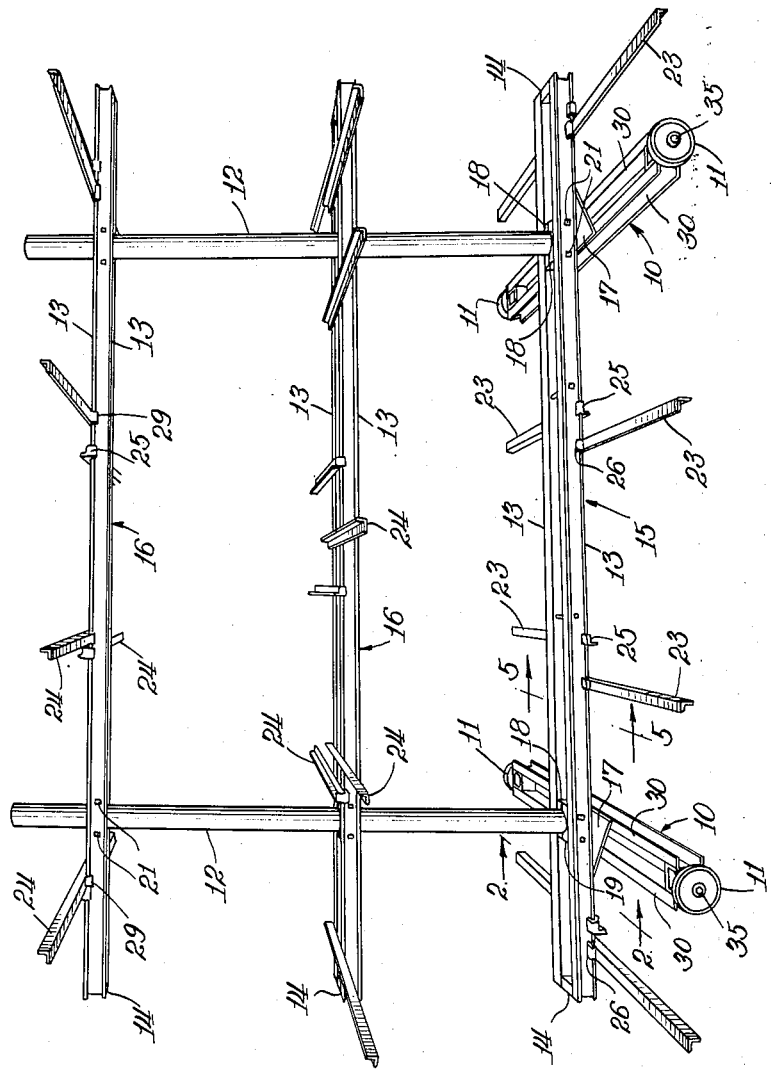
INVENTOR.
Claud C. Riemenschneider
BY
Eugene M. Giles atty.

April 1, 1958     C. C. RIEMENSCHNEIDER     2,828,826
PORTABLE RACK
Filed June 14, 1954     4 Sheets-Sheet 2
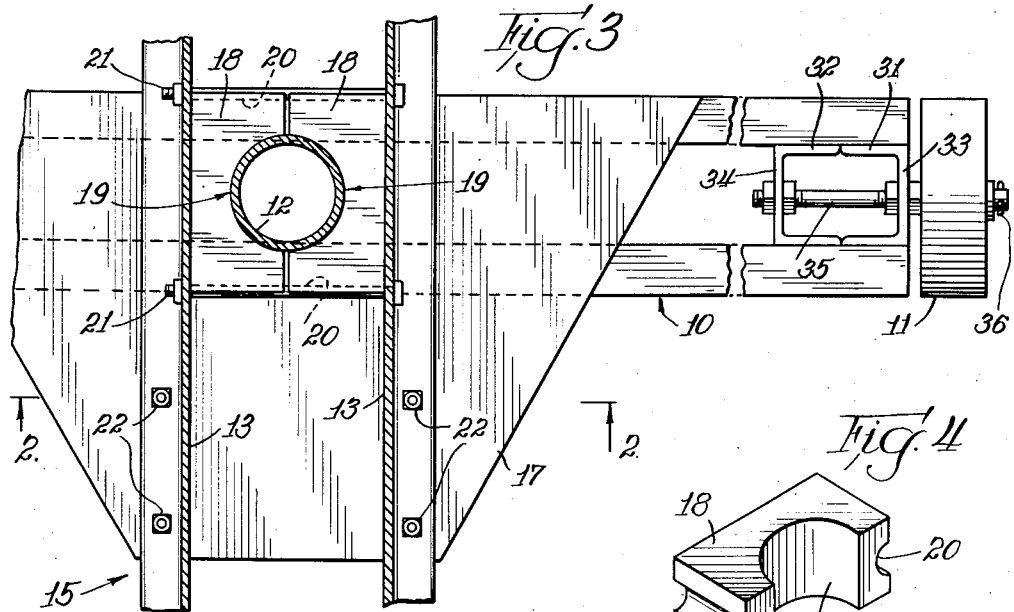
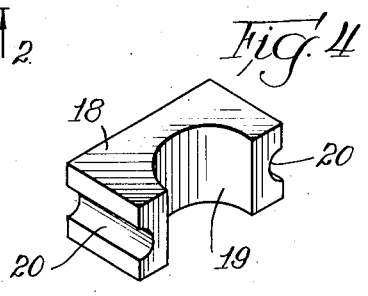
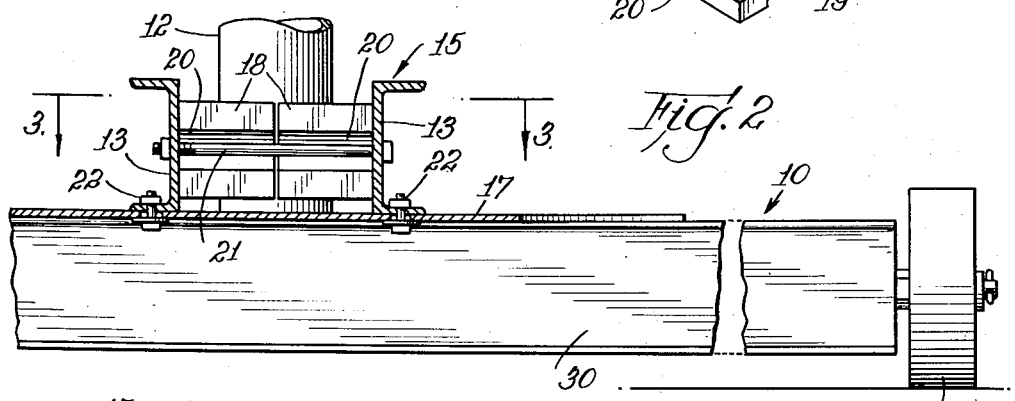
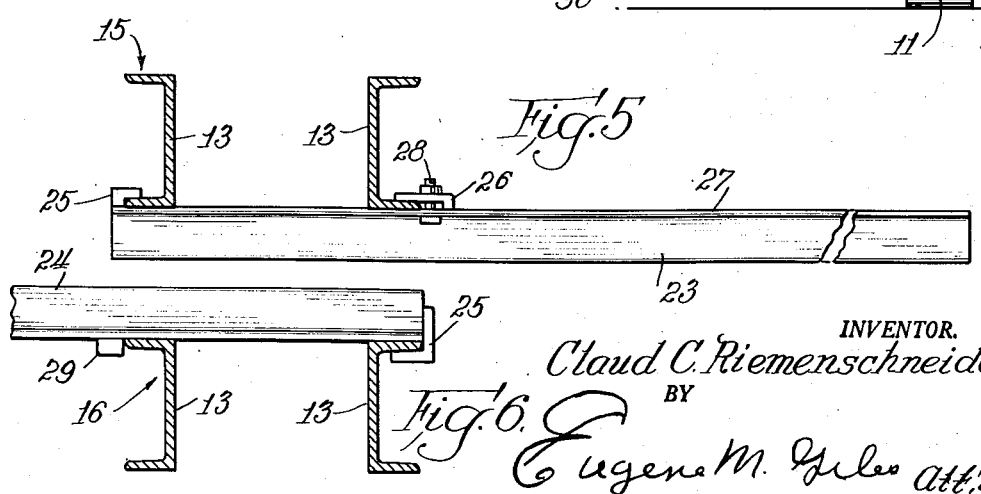
INVENTOR.
Claud C. Riemenschneider
BY
Eugene M. Giles Att'y

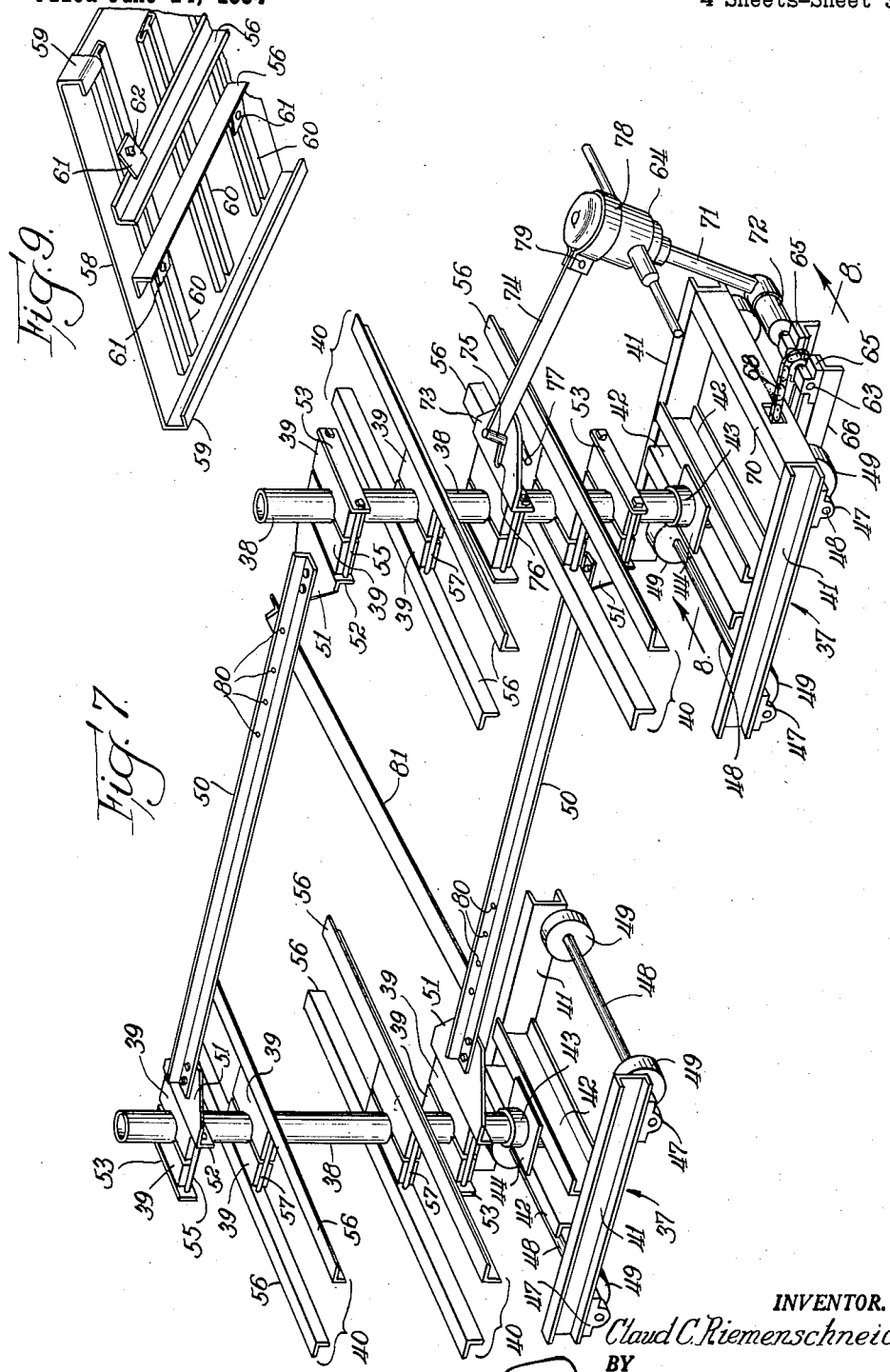

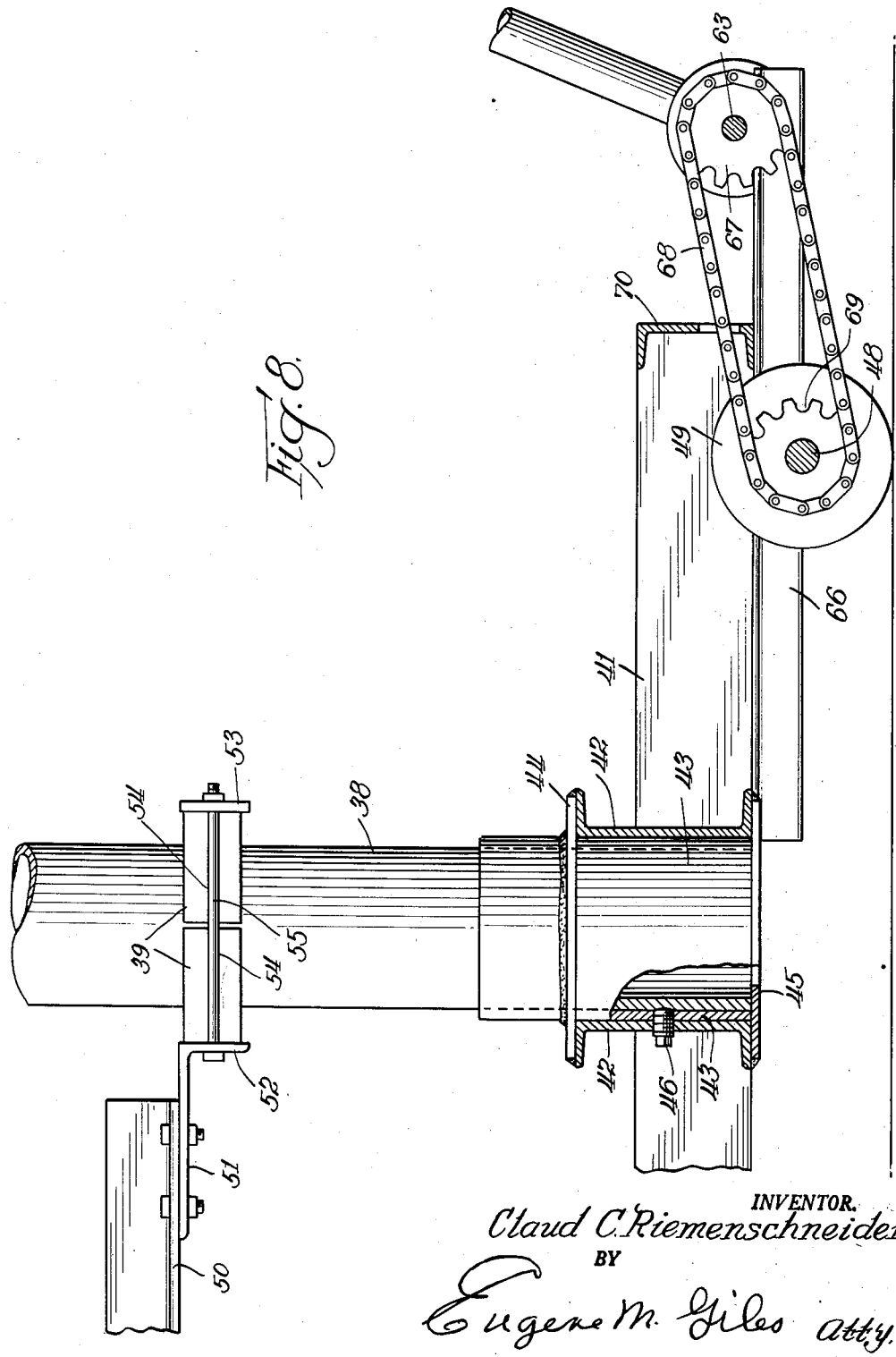

United States Patent Office 2,828,826
Patented Apr. 1, 1958

2,828,826

PORTABLE RACK

Claud C. Riemenschneider, Western Springs, Ill.

Application June 14, 1954, Serial No. 436,303

10 Claims. (Cl. 180—1)

This invention relates to racks suitable for storage of furniture, carpets, and the like which are adapted to be arranged in close serial relation along an aisle and are individually movable outward into the aisle for loading articles thereon and removal of articles therefrom, and has reference more particularly to a knock down construction thereof.

In the storage of large, bulky articles, such for example as furniture and carpeting, considerable space is required for loading and unloading and in order to economize space it is customary to arrange the racks close to one another in series along an aisle and provide them with wheels thereon permitting them to be moved individually out into the aisle for loading and unloading.

Generally, also, it is desirable to construct these racks in knock down form so that they may be shipped in compact disassembled form, and furthermore it is also desirable to construct them so that the supports thereof on which the articles or materials are stored may be adjusted elevationally to accommodate articles of different sizes without wastage of space, and that the supports at each level be adjustable relative to one another, or additional supports supplied if necessary and as needed to properly support the particular articles to be accommodated thereon.

The principal objects of this invention are, to provide an improved rack of the above mentioned type; to permit the rack to be conveniently assembled and disassembled without difficulty; to insure ample strength to support heavy loads and with a minimum of material required in the construction thereof; to provide a mounting of the supporting facilities at the different levels whereby they may be readily adjusted and securely and safely held at the selected levels and extra supporting facilities for additional levels readily added thereto; to provide convenient adaptability of the rack for articles of different kinds, shapes and sizes and adjustability of the supporting member at each individual level as required for the particular nature of the articles supported thereon; and to utilize interchangeable and standardized parts in the make up of the rack and made of stock material readily available on the market, these and other objects being accomplished as pointed out more particularly hereinafter and as shown in the accompanying drawings, in which:

Fig. 1 is a perspective view of a rack suitable for storage of furniture or the like and made in accordance with this invention;

Fig. 2 is an enlarged fragmentary view with parts broken away and other parts in section, taken on the line 2—2 of Fig. 1, and showing the side of one of the trucks and the post support thereon;

Fig. 3 is a top view of the parts shown in Fig. 2 but with portions thereof in section on the line 3—3 of Fig. 2, a section line 2—2 being shown in said Fig. 3 which corresponds to the section line 2—2 of Fig. 1 on which Fig. 2 is taken;

Fig. 4 is a perspective view of one of the halves of the clamps by which the uprights or posts of the rack are mounted and the supporting facilities at the different elevations are secured to the posts;

Fig. 5 is an enlarged detail view on the line 5—5 of Fig. 1 showing the manner of securing supporting arms on the lower rails of the rack;

Fig. 6 is a similar enlarged detail view showing the manner of securing supporting arms on the rails at levels above the lower rails;

Fig. 7 is a perspective view of a modified form of rack more particularly suitable for supporting rolls of carpeting or the like, and showing a power connection thereto for propelling the rack;

Fig. 8 is an enlarged view of a portion of the rack of Fig. 7 and with parts thereof in section, showing the post mounting, the connection of a post spacer and the propelling connection with supporting wheels; and Fig. 9 is a fragmentary perspective view of a platform type of support which may be employed with the Fig. 7 rack.

Referring first to the rack of Fig. 1, details of the construction of which are shown in Figs. 2, 3, 4, 5 and 6, the rack has two spaced apart elongated trucks 10 which are suitably spaced apart in parallel relation, each having a pair of wheels 11 at the opposite ends respectively thereof by which the rack is supported in a portable manner for movement along the floor in a straight line direction.

Each truck 10 has a post 12 secured at its lower end to the respective truck midway of the ends of the latter and these posts are connected to one another in perpendicular spaced apart relation by corresponding vertically spaced pairs of stringers 13 wherein the stringers of each pair are arranged at the opposite sides respectively of the posts and preferably project at their opposite ends substantially beyond the posts 12 as shown, the stringers 13 of each pair preferably being secured to one another at their ends in proper spaced apart relation by end members 14 so that each pair of stringers 13 with its end connections constitutes a unitary frame. For convenience the lower frame is indicated as a whole by the reference numeral 15 and the other frames each by the reference numeral 16.

The frame 15 is at the lower ends of the posts directly above and secured to the trucks 10 and the other frames 16, and any number thereof desired, are arranged at intervals above the frame 15 and it is an important feature of the invention that the latter frames 16 are capable of convenient vertical adjustability on the posts to any desired elevation thereon and are readily securable in an immovable manner to the posts in any such selected elevation.

For securing the lower frame 15 to the trucks 10 and to provide end bearing plates for the posts 12, each truck has a plate 17 secured to the top thereof, and centrally of the length of the truck, in any convenient manner and each said plate 17 is preferably of generally triangular shape, as shown in Fig. 3, with a truncated apical portion projecting toward the adjacent ends of the bottom frame 15 as shown in Figs. 1 and 3.

These plates 17 are preferably permanently secured to the trucks, preferably by welding, so that they are a part of the truck construction.

Clamps which embrace the posts 12, and each composed of two parts 18, are located between the stringers 13 of each frame at appropriate places, one part or half of such two part clamp being shown in Fig. 4, and these clamps are all the same and the parts 18 thereof are all alike.

Each clamp part 18 is in the form of a generally rectangular block with a semi-circular seat 19, but slightly less than 180 degrees, at one side thereof and the radius of which is half the diameter of the post 12 so as to fit closely thereagainst and each clamp comprises two of these blocks located at opposite sides respectively of the post with the seats 19 thereof opposed to one another to clamp the post 12 therebetween.

Each clamp part 18 has a groove 20 at each end positioned to align with the corresponding grooves 20 of the companion part 18 and adapted to accommodate bolts 21 by which the clamps are held in place between the stringers 13 and by which the clamping halves 18 are drawn toward one another to clamp a post 12 therebetween.

At the proper places where the posts 12 are to extend therebetween, the stringers 13 of each frame have matching bolt holes spaced apart on centers to accommodate at each post location a pair of bolts 21 in such spaced apart relation to be located in the grooves 20 of the pair of clamping parts 18 between the pair of stringers, so that these bolts retain the pairs of clamping blocks 18 in paired position between the pairs of stringers as part of the frame assembly.

As will be readily understood, tightening these bolts 21 clamps the interposed post 12 between the opposed clamp halves 18 and holds the frames securely in the position of clamping on the post and releasing the bolts 21 frees the clamps sufficiently from the post so that the frames may be adjusted elevationally on the posts, the stringers 13 of each frame being spaced apart just the proper distance to accommodate the clamps therebetween and having sufficient deflectability at the clamp locations to permit the required clamping and releasing of the clamps.

The lower frame 15, however, is not elevationally adjustable but instead is secured to the trucks 10, preferably by bolts 22 engaged through the plates 17 and each clamp 18, 18 between the stringers 13 of the frame 15 provides a clamping socket for the lower end of the respective post which bears against a plate 17 thereunder.

It is an important feature of this invention that it is designed so that substantially all of the component parts of the rack are made of standard stock materials which are readily available, the posts 12 being appropriate lengths of common iron pipe, the stringers 13 of channel iron, the plates 17 of plate stock, the end connectors of plate strips or bar stock, and the other parts hereinafter described are of similar standard stock. Even the truck wheels 11 are standard items that are readily available. Accordingly, the clamps are the only parts that may be required to be made specially and these are of simple form with both halves alike and inexpensive to produce.

Thus the rack may be constructed at a minimum of expense and substantially all of the materials for making the racks can usually be obtained at the place of installation if it is desired to do so.

Arms 23 are provided on the lower frame 15 and similar arms 24 on the frames 16, for supporting the articles, such as furniture, which are to be stored on the racks, which said arms 23 and 24 are detachably secured to the respective frames and adjustable therealong to correspond to the requirements of the particular articles to be supported thereby, and it is to be understood that any required number of such arms may be provided on the frames. Moreover, these arms preferably project at opposite sides of the frames 15 and 16 so as to form two sided racks and it is also preferable that the arms 23 and 24 at one side of the rack be separate and independent from those at the other side so that the arms at the opposite sides are independently adjustable.

Each of these arms 23 and 24 comprises a suitable length of angle iron having a hook formation 25 at one end to engage a flange of a channel iron stringer 13. The arms 23 of the bottom frame 15 preferably extend under the stringers 13, as shown in Fig. 5, and each has an angle clamp 26 connected with the upper flange 27 of the angle iron arm 23 at a suitable distance from the hook 25 end of the angle iron by a bolt 28 so that when the hook 25 is engaged with the lower flange of one of the channel iron stringers 13 the angle clamp 26 may be turned to overlie the lower flange of the mating channel iron stringer 13 and clamped thereagainst to lock the arm 23 in place on the stringers 13 of the lower frame. Obviously these arms are readily attachable and may be adjusted to any position along the bottom frame 15 except at the post 12 locations.

The arms 24 of the other frames 16 may be the same as and attached in the same manner as the arms 23. Preferably, however, the arms 24 extend over the top of the stringers 13 of the frames 16 instead of underneath, as in the case of the arms 23. Also, instead of an angle clamp being employed such as at 26 in Fig. 5, a plain lug 29 may be employed which merely depends down at the outer edge of the upper flange of the channel iron 13 at the opposite side of the posts from the channel iron 13 with the upper flange of which the hook 25 is engaged, all as shown in Fig. 6. Thus the arms as thus described may be installed by merely engaging the hook 25 with the upper flange of one channel iron 13 while the other end of the arm 24 is slightly raised, and then dropping the arms down to lie on top of the paired channel irons 13 with the lug 29 positioned as shown in Fig. 6 so that the hook 25 cannot be released except by lifting the load carrying end of the arm 23.

The trucks 10 are alike and each comprises a pair of channel irons 30 which are secured together midway between their ends in spaced apart parallel relation by the respective plates 17. At their outer ends are two short lengths 31 and 32 of channel iron which are secured between the channel irons 30, the one 31 at the extreme ends of the channels with the web portion 33 flush with the ends of the channels 30 and with the flanges thereof extending inwardly whereas the other short length 32 is reversed and has the web portion 34 thereof remote from the ends of the channel 30 and the flanges extending outwardly as shown in Fig. 3.

The web portions 33 and 34 are provided with matching openings for a shaft 35, the inner end of which is threaded and provided with nuts thereon to engage the opposite sides of the web 34 and thereby lock the shaft in position with the other end of said shaft 35 projecting outwardly beyond the respective end of the truck frame (composed of the two channel irons 30, 30 and the short channels 31, 32 at the ends), and this projecting end of the shaft 35 has the wheel 11 mounted to rotate thereon and held thereon by a cotter 36 passing through an opening provided therefor at the outer end of the shaft 35.

Thus the Fig. 1 rack is readily movable directly outward from its position in close adjoining relation to other similar racks at opposite sides thereof and returnable to the same position, the arm supporting frames 16 may be readily adjusted to any desirable elevations on the posts 12 and the arms 23 and 24 are readily adjustable along the frames 15 and 16 to any desired positions.

The rack of Fig. 7, details of which are shown in Fig. 8, is of the same general nature as that of Fig. 1 but of heavier construction for heavier loads, especially rolls of carpeting.

Four wheel trucks 37 are provided at the opposite ends of the rack each of which has a tubular post 38 extending upwardly therefrom at the center and two part clamps composed of two parts 39 like the clamp parts 18 of the Fig. 1 construction are employed for securing post spacers to the posts 38 and for securing vertically adjustable supports 40 to the posts 38.

Each truck 37 comprises a pair of laterally spaced lengths 41 of channel iron at the opposite sides respectively of the truck and permanently secured to the opposite ends of a pair of cross lengths 42 of channel iron which are located midway between the ends of the opposite side channel irons 41 and midway between their ends have a socket member 43 secured thereto for receiving the lower end of one of the posts 38.

Each socket member 43 extends through a rectangular plate 44 which overlies the cross channels and is secured to the top flanges thereof, and at the lower end the socket member rests on a bottom plate 45 which underlies the cross channels and is secured to the bottom flanges thereof, all as shown in Fig. 8. The post 38 has the lower end telescoped in the respective socket 43 and is secured therein by a set screw 46 which is threaded through one of the cross channels 42 and the wall of the socket 43 at one side thereof.

On the underside of each of the side channels 41 of each truck 37 are a pair of bearing brackets 47 located respectively at the opposite ends of the channels with the bearing of each side channel 41 aligned with the corresponding bearing of the channel at the opposite side and each pair of aligned bearing brackets 47 has the opposite ends of a cross shaft 48 journaled respectively therein with a pair of supporting wheels 49 fixed thereon at the inner sides respectively of the two side channels.

The wheels 49 at opposite ends of each side rail track in the same path and the trucks 37 are arranged so that the wheels at each side of the one truck track in the same path as the wheels 49 at the same side of the other truck so the rack of Fig. 7, like the rack of Fig. 1, is movable directly in and out in the same path from its position between the similar closely adjoining racks.

Angle iron stretchers 50 extend between the posts 38 to hold them and their trucks in predetermined spaced apart relation and at their opposite ends these stretchers 50 are provided with clamps, like those of the Fig. 1 construction, by which the opposite ends of the stretchers 50 are clamped to the posts and are vertically adjustable therealong.

For providing these clamps thereon, each stretcher has at each end a plate 51 secured thereto and provided at its outer end with a downturned flange 52 in a plane perpendicular to the longitudinal axis of the stretcher 50 and cooperable with a bar 53 of the same length as and parallelling the flange 52 to hold the two parts 39 of the clamp therebetween.

The two parts 39 of the clamp are, as aforesaid, the same, except perhaps as to size, as those of the clamps 18, 18 of the Fig. 1 rack and have bolt receiving channels 54 to accommodate bolts 55 which extend through matching bolt holes in the flange 52 and bar 53 in proper spaced apart relation to be located in the channels 54 and hold the clamping parts 39 therebetween. By tightening these bolts, the clamping parts 39 are caused to clamp against the respective post 38 and thereby lock the posts to one another and by loosening the bolts 55 of the clamps at the opposite ends thereof, the stretchers 50 may be adjusted along the posts 38 to any desired elevation.

These stretchers may have a series of bolt holes 80 for securing a diagonal brace 81 thereto for bracing.

Adjustable supports 40 are clamped in a similar manner to the posts 38 for supporting the articles on the rack, for example, rolls of carpeting, and each such support comprises a pair of laterally spaced parallel angle irons 56 midway between the ends of which are interposed a pair of post clamping parts 39 which are held between the angle irons by bolts 57 by which the clamp composed of the two parts 39 together with the angle irons are securable to the post 38 at any desired elevation and are adjustable therealong to different elevations.

The supports 40 extend equally at opposite sides of the posts 38 and may have platforms on the opposite side portions if desired.

Such platform is shown in Fig. 9 and comprises a panel 58, preferably of sheet metal with downturned lateral margins 59 for stiffening. A number of folded sheet metal stiffening members 60 extend crosswise of the panel 58 on the underside at spaced intervals and rest on the angle irons 56 to which the panel is secured by clips 61 which underlie horizontal flanges of angle irons 56 and are clamped thereagainst by bolts 62.

For convenient portability of the rack, a shaft 63 may be provided on one of the trucks 37 for and arranged for detachable connection therewith of a portable power unit 64 by which the rack may be power operated to and from its place in the series of racks.

This shaft 63 is journaled in bearings 65 on the outer ends of two angle irons 66 which extend underneath the truck as shown in Fig. 8 and are secured thereto, and this shaft has a sprocket 67 fixed thereon and connected by a sprocket chain 68 with a sprocket 69 fixed on the adjacent wheel 49 carrying shaft 48 so that rotation of the shaft 63 is communicated to the shaft 48 which has the wheels 49 fixed thereon.

For securing the angle irons 66 to the truck 37 which has the power drive 63, 67, 68 thereon, this truck has a channel iron 70 extending between and secured to the ends of the side channels 41 thereof nearest the power drive, and the angle irons 66 which support the drive shaft 63 are secured to the underside of this channel iron 70 and have their inner ends secured to the nearest one of the cross channels 42 thereof.

The power unit 64 has an extension 71 with a driving connection 72 at right angles thereto at the outer end which is detachably engageable with an extended end of the shaft 63 to rotate the latter and this power unit is detachably braced to the nearest post 38.

For this purpose that post has a plate 73 secured thereto by a clamping connection the same as that by which the end plates 51 of the stretchers 50 are secured to the posts 38, and this plate 73 has a brace 74 connected thereto by which the power unit is detachably mounted on the rack in proper position to propel it from place to place.

This brace 74 is connected at one end to the plate 73, preferably in a detachable manner, as for example, by a laterally extending stem 75 engaged in a slot 76 of the plate 73 and of T-shape with a cross arm portion 77 at the outer end which may be passed through the slot 76 and when turned at right angles thereto in the power unit holding position of the brace 74 retains the inner end of the brace against disengagement from the slot 76.

The outer end of the brace 74 has a circular band 78 secured thereto, as at 79, and which encircles and fits closely and removably on the upper motor housing end of the power unit 64 and thus holds the power unit in the proper position of operative connection with the shaft 63 and in the proper position of operation of said shaft 63 through that connection.

Thus the power unit 64, which is portable, may be readily attached to and detached from the rack to propel the latter and as all of the racks of the series would be provided with similar power propulsion facilities, the power unit 64 may be transferred from one to another to operate any selected one of a number of racks.

While I have shown and described my invention in a preferred form, I am aware that various changes and modifications may be made therein without departing from the principles of the invention, the scope of which is to be determined by the appended claims.

What is claimed is:

1. A knock down storage rack structure of the class described capable of being readily erected from and dismantled into its component parts and having as principal component parts thereof posts and straight lengths of flat sided bars and identical and interchangeable post clamps composed of pairs of corresponding interchangeable half sections of pillow block type and bolts by which such pairs of half sections are clamped onto the posts, the said rack structure comprising a pair of upright aforesaid posts spaced apart laterally in a common plane and having a plurality of vertically spaced rack assemblies mounted thereon and secured thereto which include such aforesaid clamps and such aforesaid straight lengths of flat sided bars and have separate laterally spaced arms secured in a fixed position and projecting straight out from the said common plane of the posts for storage of articles thereon, each such thus included clamp having its pair of aforesaid half sections of pillow block type opposed and conjointly encircling one of said upright posts and clamped thereagainst by a pair of such aforesaid bolts located respectively at opposite sides of the post and each said included clamp being interposed between a pair of such aforesaid straight lengths of flat sided bars with the flat side of each bar engaged sidewise against the outer side of a different one of the half sections of the interposed clamp and clamped sidewise thereagainst by the pair of bolts which clamp the half sections against the post and are passed through the pair of bars between which the clamp is interposed.

2. A rack structure as defined in claim 1 in which the straight lengths of flat sided bars are of angular cross section with at least two flanges at right angles to one another and the clamps are secured to vertical ones of such flanges.

3. A rack structure as defined in claim 1 in which the posts thereof are fixedly secured together in the laterally spaced apart relation by vertically spaced straight bar members which extend therebetween and are secured to the posts by some of the aforesaid identical and interchangeable clamps.

4. A rack structure as defined in claim 1 in which the posts thereof are fixedly secured together in the laterally spaced apart relation by vertically spaced straight bar members which extend therebetween and have at each end a bracket with a horizontally elongated vertical flange to which is secured one of the aforesaid identical and interchangeable clamps which is secured to the respective post.

5. A rack structure as defined in claim 1 in which the posts thereof are fixedly secured together in the laterally spaced apart relation by a pair of straight bar members which extend between the posts and have the posts interposed therebetween and each post has one of the aforesaid identical and interchangeable clamps secured thereto and interposed between and secured to the pair of straight bar members by aforesaid bolts by which the clamp is secured to the post.

6. A rack structure as defined in claim 1 in which the posts thereof are fixedly secured together in the laterally spaced apart relation by a pair of laterally spaced straight bar members which extend between the posts and have the posts interposed therebetween and are clamped thereto, and the laterally spaced arms which project straight out from the common plane of the post are secured at spaced apart places respectively to both of said laterally spaced straight bar members.

7. A rack structure as defined in claim 1 in which the posts thereof are fixedly secured together in the laterally spaced apart relation by a pair of laterally spaced straight bar members which extend between the posts and have the posts interposed therebetween and are clamped thereto, and the laterally spaced arms which project straight out from the common plane of the post are adjustably secured at spaced apart places respectively to both of said laterally spaced straight bar members and are individually adjustable therealong.

8. A rack structure as defined in claim 1 in which the laterally spaced arms which project straight out from the common plane of the posts are arranged in pairs and the arms of each pair are secured at opposite sides of a post to one of the aforesaid identical and interchangeable clamps which is clamped onto the post.

9. A storage rack structure as defined in claim 1 in which each post is detachably secured at its lower end to and supported by a separate truck having floor wheels having a fixed direction of rotation for straight line movement in a selected direction, the said posts being secured together in the spaced apart relation thereof solely by braces which extend between and are secured to the posts by some of the aforesaid identical and interchangeable clamps by which the posts are adjustable about their vertical axes to align the floor wheels of one truck with the floor wheels of the other truck.

10. A storage rack structure as defined in claim 1 in which each post is supported by a separate truck having floor wheels by which it is portable from place to place and the rack structure has a power unit detachably secured thereto at one end and having a separable power transmission connection with floor wheels of one of the trucks for operation thereof to move the rack structure from place to place.

References Cited in the file of this patent

UNITED STATES PATENTS

| | | |
|---|---|---|
| 580,655 | Thew | Apr. 13, 1897 |
| 906,458 | Oren | Dec. 8, 1908 |
| 1,367,672 | Smith | Feb. 8, 1921 |
| 1,410,740 | Elgin | Mar. 28, 1922 |
| 1,581,352 | Kuen | Apr. 20, 1926 |
| 1,733,043 | Zelewski | Oct. 22, 1929 |
| 1,804,997 | Manley | May 12, 1931 |
| 2,263,081 | Fulton | Nov. 18, 1941 |
| 2,695,071 | Hupp | Nov. 23, 1954 |

FOREIGN PATENTS

| | | |
|---|---|---|
| 741,980 | France | Dec. 20, 1932 |